United States Patent [19]

Kwack

[11] Patent Number: 4,862,564
[45] Date of Patent: Sep. 5, 1989

[54] APPARATUS FOR STRETCHING A THERMOPLASTIC MATERIAL WEB

[75] Inventor: Tae H. Kwack, Fairport, N.Y.

[73] Assignee: Mobil Oil Corporation, New York, N.Y.

[21] Appl. No.: 118,700

[22] Filed: Nov. 9, 1987

[51] Int. Cl.$^4$ .............................................. D06C 3/04
[52] U.S. Cl. ........................................ 26/89; 26/72; 26/92
[58] Field of Search ................... 26/72, 73, 89, 91, 92, 26/94

[56] References Cited

U.S. PATENT DOCUMENTS

| | | | |
|---|---|---|---|
| 2,896,262 | 7/1959 | Herrmann | 26/92 X |
| 3,078,504 | 2/1963 | Koppehele | 26/91 X |
| 3,247,544 | 4/1966 | Bromley | 26/73 |
| 3,254,148 | 5/1966 | Nichols | 26/92 X |
| 3,432,894 | 3/1969 | Sass | 26/90 X |
| 3,551,546 | 12/1970 | Gosper et al. | 26/94 X |
| 3,577,586 | 5/1971 | Kalwaites et al. | 26/92 X |

FOREIGN PATENT DOCUMENTS

| | | | |
|---|---|---|---|
| 235548 | 5/1959 | Australia | 26/73 |
| 1177806 | 9/1964 | Fed. Rep. of Germany | 26/94 |
| 1275219 | 9/1961 | France | 26/72 |

Primary Examiner—Robert R. Mackey
Attorney, Agent, or Firm—Alexander J. McKillop; Charles J. Speciale

[57] ABSTRACT

A thermoplastic material web is stretched transverse to the machine direction along a stretch course which widens exponentially in the stretching zone, an improved stretching apparatus being used to effect such stretching.

3 Claims, 4 Drawing Sheets

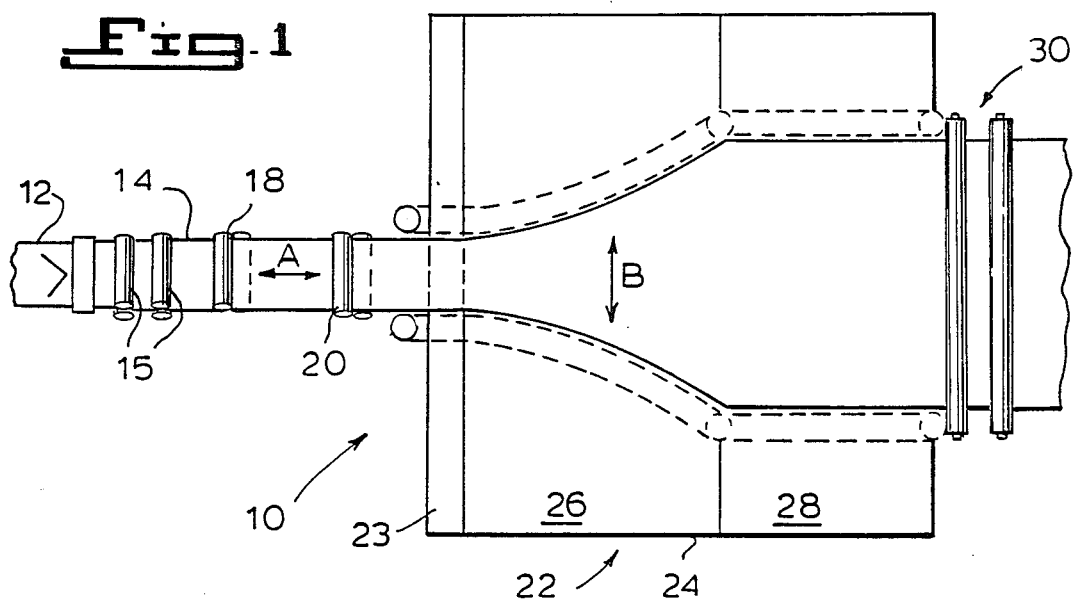
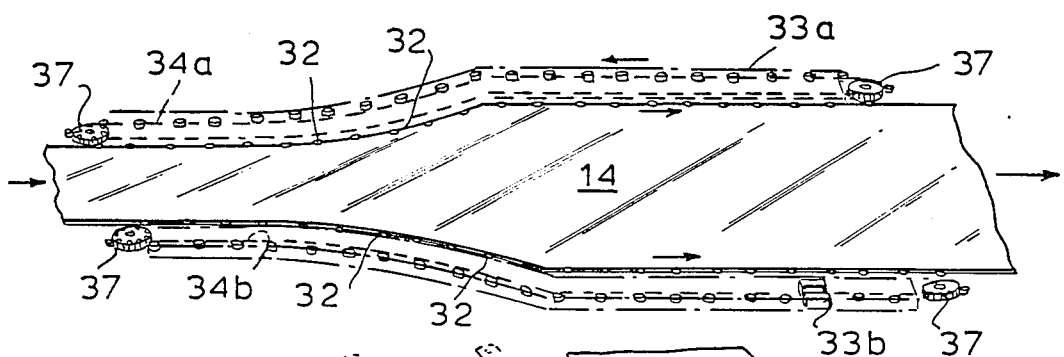
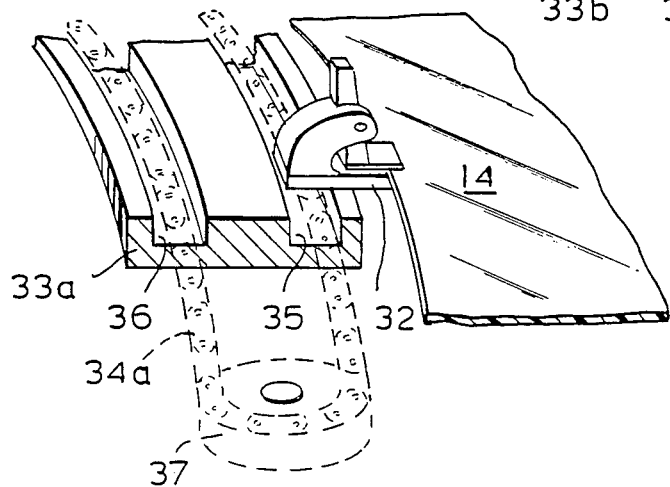

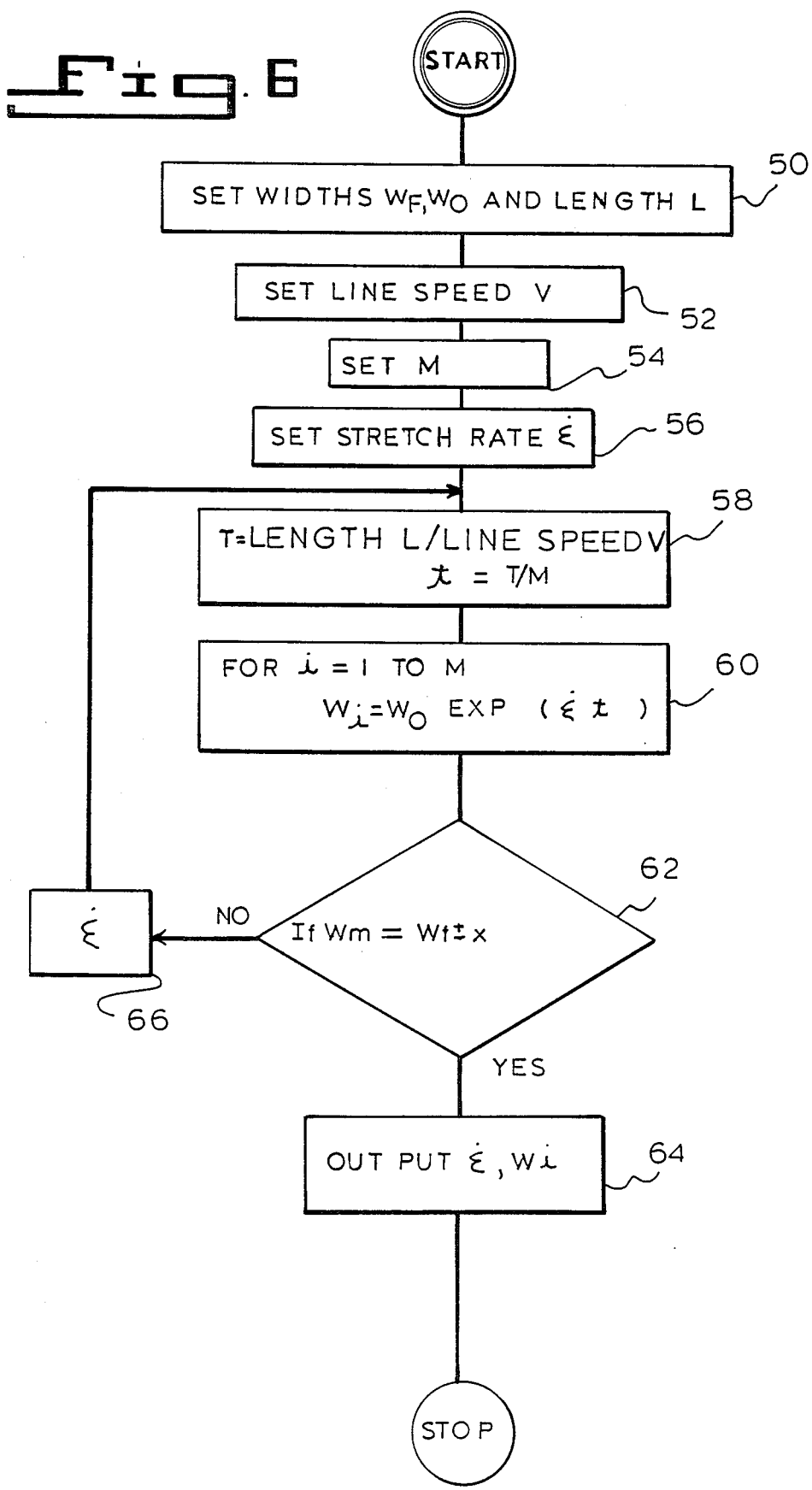

APPARATUS FOR STRETCHING A THERMOPLASTIC MATERIAL WEB

BACKGROUND OF THE INVENTION

Thermoplastic, e.g., polymer films have many commercial and domestic uses and demand for production of same continues to increase. In one manner of making such a film, e.g., a polyethylene, PET or nylon film, a molten resin is extruded in the form of a film or web, the film is then quenched and following quenching, the film is stretched in both the longitudinal and transverse directions. Commonly, the film will first be stretched longitudinally as with passage thereof through a differential spaced roller set. The longitudinally stretched film is then heated to an elevated temperature and passed through a tenter apparatus wherein transverse stretching of the film is accomplished in a stretching zone by means of tenter clips which grip the marginal edges of the film. In the tenter apparatus, the clips are conveyed along diagonal or laterally widening travel paths as they grip the edges of the film so that there is produced a corresponding lateral widening, i.e., a lateral stretching of the web from an initial web width to a final web width. The divergent travel paths which the clips follow during web lateral stretching generally will be straight lines or a composite of end-to-end arranged shorter straight lines, certain of which may be skewed to a small degree in respect of others. The overall profile appearance of these composite lines, while appearing to have a curvature aspect, represents straight line clip travel courses only and as discussed below, clip straight line travel involves application of undesirable high levels of tensile stress to the web. Representative of such tenter frame constructions are the disclosures of U.S. Pat. Nos. 3,529,332 3,727,273 and 3,916,491 also discloses a straight line laterally widening stretching course. A characteristic of this stretching of a web along straight line laterally widening paths is the creation immediately at the entry location to the stretching zone of a stretch rate condition in the web which has its maximum value at that location. If the tensile stress imposed on the web of film at this maximum value stretch rate exceeds the critical stress of the web, the web can be ruptured. The prime disadvantage of web rupture is, of course, the need to stop the film production line, clear the rupture and then restart the line. This downtime of the film manufacturing line is costly and must be avoided if the economical advantages of continuous manufacturing operations are to be realized.

SUMMARY OF THE INVENTION

The present invention relates to improvements in both the method and apparatus by which lateral or transverse direction stretching of a polymeric film is obtained.

In accordance with the invention, lateral stretching of the forwardly travelling web is effected in a manner as reduces the stretch rate to which the web is subjected and especially at the entrance to the stretching zone where lateral web widening is initiated. This reduction of the stretch rate below the values attending use of prior stretching methods and apparatus most significantly minimizes the possibility of web rupture.

The invention provides that the foregoing be achieved by laterally widening the web along widening travel courses which widen relative to the web forward travel axis at an exponential rate. In other words, the gripping members (i.e., tenter clips) which grip the marginal edges of the web are guided in the forward travel direction along a curvilinear, or more preferably, an exponential travel course. The exponential rate at which the travel course widens can vary in accordance with the formula $$W = W_o \exp(\dot{\epsilon} t)$$

Where $W$ is the web width at any selected location forward of the web entry to the stretching zone, $W_o$ is the initial web width, $\dot{\epsilon}$ is the stretch rate and $t$ is the forward travel time of the web between the stretching zone entry and the selected location.

The stretching rate $\dot{\epsilon}$ which is selected can vary over a range of values dependent on the type of thermoplastic material from which the web is made. Conveniently, this stretch rate will be maintained at a constant value for the full length of the stretching zone although it could be varied. For example, the stretch rate may be decreased at the end of the stretching zone to provide a smooth transition in the course which the gripping members follow.

The exponential profile provided by the present invention is particularly helpful at high line speeds, such as 500 to 1200 F.P.M., or more. This is because the tensile stress imposed on the film by the tenter apparatus is directly proportional to the speed at which the film passes through the apparatus. The point of critical stress of the film imposes a limitation on the line speed in conventional tenter apparatus because of their high stretch rate at the start of the stretching operation. Thus, conventional apparatuses cannot operate at high line speeds unless other measures are taken to reduce the stress on the film, such as by heating the web to high temperatures, which has a number of deleterious affects on the final product, as well known in the art. The apparatus of the present invention may operate at a much higher line speed because of the much lower stress it imposes on the film, especially at the start of the stretching operation.

The invention accordingly comprises the features of construction, combination of elements, arrangements of parts and steps involved in stretching a web and with the stretching apparatus, which will be exemplified in the construction and method hereinafter set forth, and the scope of the invention will be indicated in the claims.

BRIEF DESCRIPTION OF THE DRAWINGS

A fuller understanding of the nature and objects of the invention will be had from the following detailed description taken in conjunction with the accompanying drawings in which:

FIG. 1 is a plan view of a tenter apparatus, with parts broken away, which is employed for stretching a web in accordance with the invention;

FIG. 2 is a fragmentary perspective view showing the stretching zone of the tenter apparatus;

FIG. 3 is a fragmentary perspective view of a portion of the tenter apparatus of the present invention;

FIG. 6 is a flow chart showing the method in which an exponentially widening profile, in accordance with the present invention, may be calculated.

Throughout the following description, like reference numerals are used to denote like parts in the drawings.

DETAILED DESCRIPTION OF THE PREFERRED EMBODIMENTS

Figure 4:
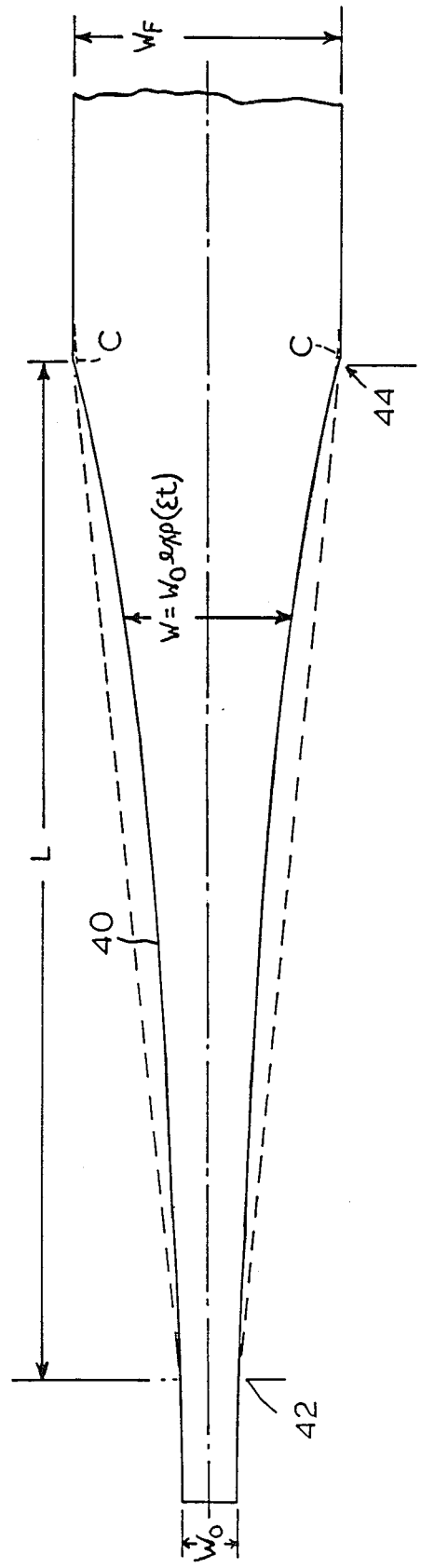
FIG. 4 shows in plan outline the laterally widening courses followed by the web marginal edge gripping clips during stretching travel thereof, as provided by the invention and as compared with the prior used, straight line stretch travel course.

FIG. 1 shows generally schematically a tenter apparatus 10 constructed in accordance with the present invention with which a thermoplastic material is formed into a stretched film or web.

Many different materials are suitable for stretching by the apparatus. These materials include polyolefins, such as polyethylene and polypropylene; polyesters, such as PET (polyethylene terephthalate); polyamides, such as nylon; and polystyrene.

The tenter apparatus of the present invention includes an extruder 12, which extrudes a web 14 of thermoplastic material, and casting rolls 15 which quench the hot molten resin and feed the solidified web on to a longitudinal or machine direction preheat zone. Differential roller sets 18, 20 stretch the web in the machine direction, as shown by arrow A. The web then enters the tenter frame assembly shown generally at 22 and which includes a tenter oven 24 where the web is heated. The oven 24 is divided into a first preheat zone 23, a second zone 26 in which the web is stretched widthwise, as shown by arrow B, and a third zone 28 wherein the stretched web is annealed or heat set. The stretched web then passes onto a web trimming and windup operation as shown generally at 30. Such structure of the tenter apparatus is conventional, and described in greater detail in U.S. Pat. No. 3,916,491, mentioned previously.

In passing through zones 23, 26, which will be maintained at an elevated temperature as is conventional, the web is gripped at the marginal edges thereof by tenter clips 32. The tenter clips employed with the invention are of known construction, being, e.g., of the type disclosed in the U.S. patents referred to earlier. The clips 32 ride on guide rails 33a, 33b and are transported on the rails by endless chains 34a, 34b, as well known in the art and shown in U.S. Pat. No. 3,490,094.

As shown in FIG. 3, the guide rails define inner and outer tracks 35, 36 for guiding the tenter clips. As shown in FIG. 2, the chain and clips follow the inner track 35 in the direction of forward travel of the web 14, and return by following the outer track 36. An example of a conventional guide rail structure is shown in U.S. Pat. No. 3,490,094, mentioned previously. The endless chains 34a, 34b are powered by driven sprockets 37 and follow laterally widening travel courses in the zone 26 so that the web is correspondingly laterally widened or stretched.

In conventional tenter frame assemblies, the guide rails are each formed as a straight elongated member or as a series of straight segments joined end-to-end, each segment being adjustable to a small degree in angular orientation with respect to the next adjacent segment to provide as close as possible a straight line guided course for the tenter clips to follow.

Thus, in a conventional tenter apparatus, such as disclosed in the U.S. patents referred to earlier, the guide rails follow straight line paths which diverge from the longitudinal axis of web travel, as shown by the dashed lines in FIG. 4. In the present invention, however, the guide rails 33a, 33b follow a curvilinear, preferably exponential, course. This course allows the web 14 to stretch at a constant stretch rate all along the stretch zone, which rate is significantly lower than stretch rates of conventional tenter apparatuses operating at a comparable line speed, especially at the start of the stretching operation.

The present invention provides that the lateral stretching of the web, as shown in FIG. 4, be effected along the curvilinear courses 40 which laterally widen in the machine direction and between the initial course point 42 and terminal point 44, that widening occurring at an exponential rate in accordance with the formula $$W \times W_o \exp(\dot{\epsilon} t) \qquad \text{Equation 1}$$

wherein W is the web width at any selected location between points 42 and 44, $W_o$ is the initial web width, $\dot{\epsilon}$ is the stretch rate, and t is the forward travel time between point 42 and a selected location.

For an exponential profile over the full length of the stretching zone 26, that is, from point 42 to point 44 in FIG. 4, Equation 1 may be rewritten as:

$$W_F = W_o \exp(\dot{\epsilon} T) \qquad \text{Equation 2}$$

where $W_F$ is the desired final web width obtained at point 44, and T is the time it takes for the web to traverse the full length of stretching zone 26.

Time T is equal to the length L divided by the line speed v of the stretching zone 26. Thus, Equation 2 may be rewritten as:

$$W_F = W_o \exp(\dot{\epsilon} L/v) \qquad \text{Equation 3}$$

Because $W_o$ and $W_F$ represent known and desired values of web width, and the length L of the stretching zone 26 is a fixed and predetermined value, a stretch rate $\dot{\epsilon}$ can be calculated for a desired line speed v, which stretch rate will provide a web imposed stretching tensile stress which is well below the critical stress value at which the web will fracture.

Thus, Equations 1 through 3 may be used to provide a plot of the profile or course which the guide rails 33a, 33b must follow in the second, stretching zone 26 of the apparatus.

The exponentially widening profile, in accordance with Equation 1, may be calculated by trial and error methods for a given line speed, as illustrated by the flow chart of FIG. 6. Such methods are perfectly adaptable to be carried out by a computer.

The first step of the method (illustrated by block 50) is to input values for $W_o$, the initial web width; $W_F$, the final or end web width; and L, the length of the stretching zone of the apparatus, more specifically defined as being the distance between the initial course point 42 and the terminal point 44.

Next, a particular line speed, v, is chosen (see block 52).

The stretch zone 26 is then divided into an arbitrary number of segments M (block 54), and the stretch rate is selected (block 56).

As shown by block 58 in the flow chart of FIG. 6, the total time T it takes for a portion of the web to travel from initial course point 42 to terminal point 44 is calculated by dividing the length L by the line speed v, and the incremental time t that it takes the web portion to traverse one of M segments is determined by dividing total traversal time T by M segments.

Using iterative techniques, that is (i=1 to M), and Equation 1, a series of discrete values of the web width $W_i$ can be determined for each one of M segments (block 60). If, at the end of the iterative calculation step in block 60, the value $W_M$ corresponding to the calculated width of the web at segment M is within a predetermined range, $\pm X$, of the desired final web width $W_F$ (see block 62), the program will terminate, and the values of $\epsilon$ and $W_i$ are outputted (block 64). If $W_M$ is outside of the range afforded by $W_F \pm X$, the program is reinitiated using a new stretch rate $\epsilon$ incrementally changed from the previously used stretch rate by a small factor, $\Delta\epsilon$ (block 66).

The $W_i$ values calculated by the above-described method provide the plot for the course which the guide rails, 33a, 33b and in particular, the inner tracks 35 thereof, must follow in the second stretching zone 26. An example of such a plotted course is illustrated by FIG. 4. The prior art straight line widening course for the same stretch path length L and the same initial and final web widths $W_o$, $W_F$, is shown in dashed lines in FIG. 4.

Figure 5:
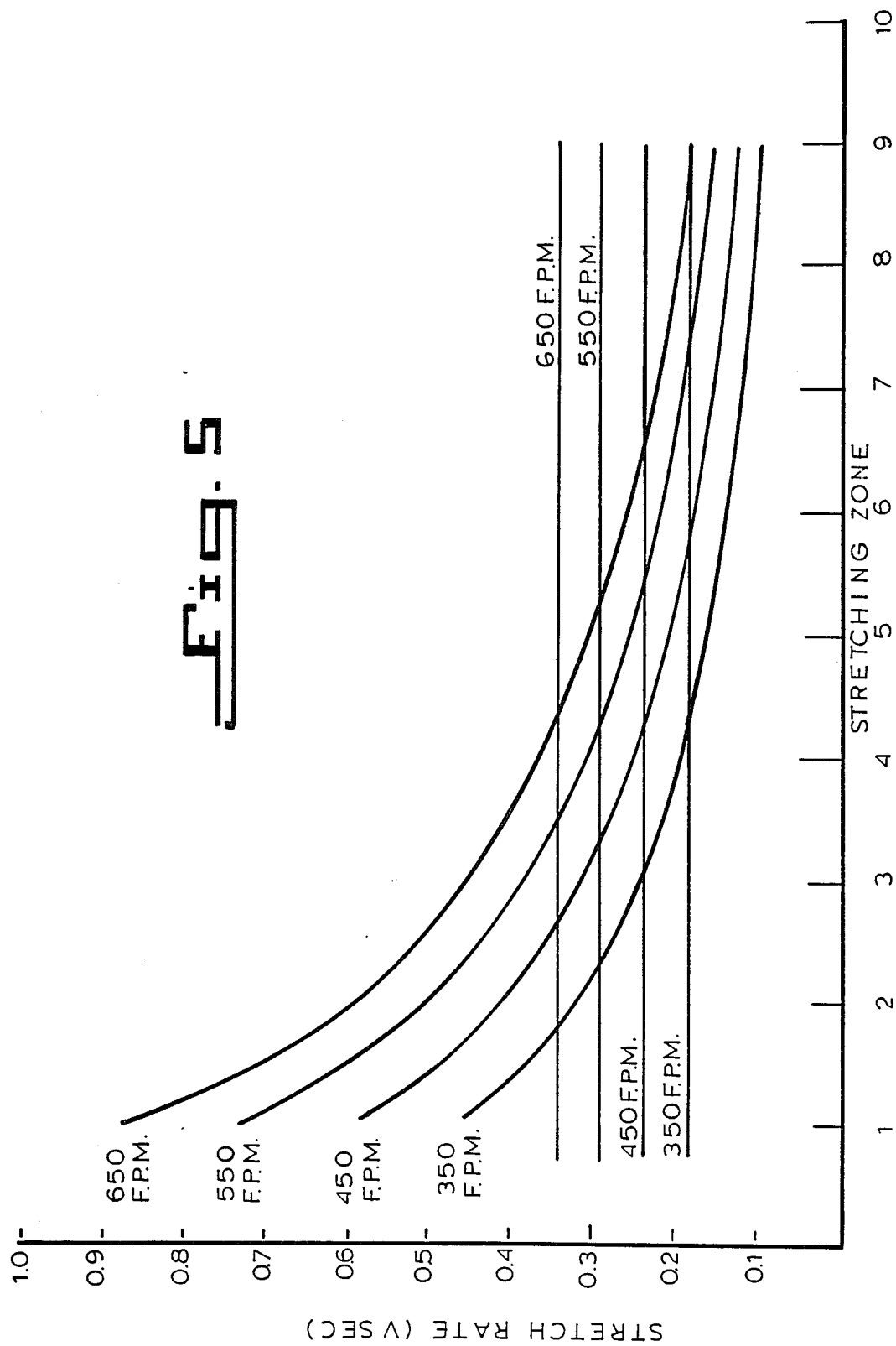
FIG. 5 is a graph comparing the stretch rates present in the practice of the invention at various web speeds with stretch rates of prior stretching methods.

FIG. 5 illustrates how the stretch rate of the film varies with respect to the line speed for a conventional tenter apparatus having a straight line widening course and for the present invention with its preferred exponential widening profile. As can be seen from FIG. 5, the use of a straight line widening course during web stretching, as taught by the prior art, results in a sudden increase in the stretch rate of the web to its maximum level at point 42, and this rate thereafter decreases exponentially to its lowest stretch rate value at the end of the stretch zone, i.e., at point 44. This stretch rate can be seen to be almost 2 ½ times greater than that which is present with stretching effected in accordance with the present invention.

The much greater stretch rate of a conventional tenter apparatus with its straight line course, especially at the start of the web stretching operation, imposes a much greater tensile stress on the web than does the present invention. For a given temperature to which the web is heated in zone 23, therefore, the present invention provides a larger margin of safety between the stress it imposes and the critical stress at which the web fractures, than a conventional tenter apparatus.

If, for example, a given web will fracture at a stretch rate of 0.9 sec$^{-1}$ at a given temperature, a conventional straight line course tenter apparatus will approach this value at a line speed of 650 F.P.M. (see FIG. 5). The present invention, on the other hand, operating at the same line speed of 650 F.P.M., will produce a stretch rate of only about 0.35 sec$^{-1}$, and thus imposes a much lower tensile stress on the web. Accordingly, because of this overall much lower stretch rate, the present invention can be run at considerably greater line speeds than conventional apparatuses without approaching the critical stretch rate that causes web fracture.

The present invention provides a constant, controlled rate of stretch to the web, as opposed to the sharp-peaked and varying rate of stretch provided with conventional, straight course tenter apparatus. Because the invention reduces the stretch rate especially at the start of stretching, the tensile stress imposed by stretching will be reduced considerably, thereby minimizing the possibility of web fracture during stretching.

The preferred exponential widening of the stretching course, as provided by the invention, is especially applicable to stretching at high web speeds, such as 600 F.P.M., 800 F.P.M. or more, because of the overall lower rate at which the web is stretched over this course.

Although the stretching profile of the invention is preferably exponential, other curvilinear profiles may be used and are envisioned to be within the scope of the invention.

For example, the exponential profile of the stretching zone 26 may be modified slightly at terminal point 44 to provide an inward curvature of each guide rail, as shown by dotted line C in FIG. 4. This curvature provides a smooth transition between the stretching zone 26 and the succeeding annealing zone 28, and results in a gradual decrease in the stretching rate at the end of the stretching operation.

While there is above disclosed only certain embodiments of the method and apparatus of the present invention, it will be understood that certain modifications and variation thereof will occur to those skilled in the art and yet remain within the scope of the inventive concept disclosed.

I claim:

1. Apparatus for stretching an elongated length of a thermoplastic web in a transverse direction only from an initial width to a final width as the web is advancing at a constant velocity in a longitudinal axial direction, which comprises:

means for gripping the marginal edges of the thermoplastic web;

means for conveying the gripping means from a first position, wherein the web has an initial width, to a second position, wherein the web has a final width, and for advanced the web at a constant velocity in the longitudinal axial direction; and means for guiding the gripping means between the first and second positions, the guiding means operatively acting on the gripping means to guide the gripping means along outwardly diverging curvilinear paths at a constant velocity between the first and second positions, wherein the curvilinear paths which the gripping means follow between the first and second positions are exponential curves and wherein the rate of stretch applied to the web over the entire distance between the first and second positions is a constant value.

2. Apparatus for stretching an elongated length of a thermoplastic web in a transverse direction only from an initial width to a final width as the web is advancing at a constant velocity in a longitudinal axes direction, which comprises:

means for gripping the marginal edges of the thermoplastic web;

means for conveying the gripping means from a first position, wherein the web has an initial width, to a second position, wherein the web has a final with, and for advancing the web at a constant velocity in the longitudinal axial direction; and means for guiding the gripping means between the first and second positions, the guiding means operatively acting on the gripping means to guide the gripping means along outwardly diverging curvilinear paths at a constant velocity between the first and second positions, wherein the curvilinear paths which the gripping means follow between the first and second positions are exponential and vary in accordance with the following formula:

$$W_F = W_o \exp(\dot{\epsilon}L/v)$$

wherein $W_F$ is the final width of the web at the second position, $W_o$ is the initial width of the web at the first position, $\epsilon$ is a preselected rate of stretch applied to the web, v is the speed at which the web advances from the first position to the second position, and L is the distance between the first and second positions measured along the longitudinal axial direction in which the web advance, and wherein the rate of stretch applied to the web over the entire distance between the first and second positions is a constant value.

3. Apparatus for stretching an elongated length of a thermoplastic web in a transverse direction only as the web is advancing at a constant velocity in a longitudinal axial direction, which comprises:

means for gripping the marginal edges of the thermoplastic web;

means for conveying the gripping means from a first position, wherein the web has an first width, to a second position, wherein the web has a second width, and for advancing the web at a constant velocity in the longitudinal axial direction; and means for guiding the gripping means between the first and second positions, the guiding means operatively acting on the gripping means to guide to gripping means along outwardly diverging curvilinear paths at a constant velocity between the first and second positions, wherein the curvilinear paths which the gripping means follow between the first and second positions are exponential and vary in accordance with the following formula:

$$W_2 = W_1 \exp(\dot{\epsilon}t)$$

wherein $W_2$ is the web width at the second position, $W_1$ is the web width at the first position, $\dot{\epsilon}$ is a preselected rate of stretch applied to the web, and t is the forward travel time that the web takes to advance from the first position to the second position, and wherein the preselected rate of stretch $\dot{\epsilon}$ applied to the web is a constant value.

* * * * *